(12) United States Patent
Bowman et al.

(10) Patent No.: US 8,777,114 B2
(45) Date of Patent: Jul. 15, 2014

(54) MONITORING MOVEMENT

(75) Inventors: Paul A Bowman, Newgate Street (GB);
Jason W P Ng, Newgate Street (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 36 days.

(21) Appl. No.: 13/505,423

(22) PCT Filed: Nov. 3, 2010

(86) PCT No.: PCT/GB2010/002030
§ 371 (c)(1),
(2), (4) Date: May 1, 2012

(87) PCT Pub. No.: WO2011/055112
PCT Pub. Date: May 12, 2011

(65) Prior Publication Data
US 2012/0217313 A1      Aug. 30, 2012

(30) Foreign Application Priority Data
Nov. 4, 2009   (EP) ..................................... 09252550

(51) Int. Cl.
*G06K 19/06* (2006.01)
(52) U.S. Cl.
USPC .......................................... 235/492; 235/385
(58) Field of Classification Search
USPC .......................................... 235/492, 383, 385
See application file for complete search history.

(56) References Cited

U.S. PATENT DOCUMENTS

| | | | |
|---|---|---|---|
| 4,246,567 A * | 1/1981 | Miller ............................ | 340/443 |
| 7,693,626 B2 * | 4/2010 | Breed et al. ................... | 701/34.4 |
| 2003/0197604 A1 * | 10/2003 | Ogawa et al. .................. | 340/445 |
| 2005/0052284 A1 | 3/2005 | Schmidtberg et al. | |
| 2007/0018819 A1 | 1/2007 | Streeb et al. | |
| 2007/0024410 A1 | 2/2007 | Yazdi | |

(Continued)

FOREIGN PATENT DOCUMENTS

| | | |
|---|---|---|
| DE | 10 2006 042735 | 4/2008 |
| WO | WO 2005/056311 | 6/2005 |
| WO | WO 2006102437 | 9/2006 |

OTHER PUBLICATIONS

International Search Report for PCT/GB2010/002030, mailed Mar. 8, 2011.

(Continued)

*Primary Examiner* — Daniel St Cyr
(74) *Attorney, Agent, or Firm* — Nixon & Vanderhye P.C.

(57) ABSTRACT

A monitoring device (10) for monitoring movement characteristics of an item with which the monitoring device is associated, the monitoring device comprising: a transducer (15) operable to generate an electrical signal in response to movement of the item; an electrical store (18) operable to store energy on receipt of an electrical signal from the transducer (15); a radio-frequency identification device (12, 13, 14) having a data recorder (14) operable to record data on receipt of an electrical signal from the transducer (15), and a radio-frequency signal transmitter (12,13) operable to transmit a radio-frequency signal indicative of data recorded by said data recorder; and an electrical signal splitter operable to split an electrical signal generated by the transducer into a first portion and a second portion, and to provide said first portion to said electrical store and said second portion to said radio-frequency identification device.

11 Claims, 2 Drawing Sheets

(56) References Cited

U.S. PATENT DOCUMENTS

| | | |
|---|---|---|
| 2007/0096906 A1 | 5/2007 | Lyons et al. |
| 2007/0107505 A1 | 5/2007 | Schillinger et al. |
| 2008/0018466 A1 | 1/2008 | Batra et al. |
| 2008/0061944 A1 | 3/2008 | Gunther |

OTHER PUBLICATIONS

Written Opinion of the International Searching Authority for PCT/GB2010/002030, dated Mar. 8, 2011.

European Search Report for EP Application No. 09252550, dated Jun. 1, 2010.

Perpetuum, "Perpetuum PMG17 Technical Specification Rev 2.0", No. 26999, http://www.perpetuum.com/pmg17.asp, 3 pages, (Jan. 18, 2008).

The Letter Logger, "Tracking the World", http://www.trackingtheworld.com/letterlogger.htm, 2 pages, (2008).

* cited by examiner

MONITORING MOVEMENT

This application is the U.S. national phase of International Application No. PCT/GB2010/002030, filed 3 Nov. 2010, which designated the U.S. and claims priority to EP Application No. 09252550.0, filed 4 Nov. 2009, the entire contents of each of which are hereby incorporated by reference.

TECHNICAL FIELD

The present invention relates to a monitoring device for monitoring movement characteristics of an item with which the monitoring device is associated, More specifically, aspects of the present invention relate to monitoring devices for monitoring movement characteristics of items with which radio-frequency identification devices are associated, in particular (but not exclusively) in relation to items in transit (in a supply-chain, for example).

BACKGROUND TO THE INVENTION AND PRIOR ART

RFID Tag Technology

Radio Frequency Identification (RFID) is an identification technology which relies on storing and retrieving data using devices called RFID tags. An RFID tag is in general a small object capable of functioning as a label, that can be attached to or incorporated into an item such as a commercial product, an animal, or a person.

Typically, an RFID tag consists of a small integrated circuit with a small storage capability and a radio antenna. Some tags, referred to as "active tags", have an internal power source which is generally used to power any processing circuitry and to generate outgoing signals. Other tags, referred to as "passive tags" do not have any internal power source. Passive tags generally obtain the energy required for responding to incoming signals and generating outgoing signals by collecting energy from an electromagnetic field generated by a reader. Also, there exist tags known as "semi-active" (or sometimes "semi-passive") tags, which generally have a small power source in order to enable the tag's processing circuitry to be powered constantly. These tags therefore do not need to collect energy from incoming signals before commencing any processing, allowing them generally to provide faster responses than passive tags, but active and semi-active lags are generally more expensive than passive tags.

An RFID tag generally holds identity information at least relating to an item with which it is associated. Current RFID tags typically offer a 96-bit identifier number that can be globally unique and addressable. Upon being queried by a reader, a tag generally responds with identity information which may point to a unique location in a database in which detailed information about the item may be stored. This may include product characteristics, data about the origin of the items the identity of a manufacturer and other manufacturing details, pricing information, any appropriate expiry dates, etc.

RFID technology is thought to be a possible at least partial replacement for barcode technology, for which there exists a standard called the Universal Product Code (UPC). An RFID tag can provide an identification number, as can a barcode, but unlike barcodes, RFID tags can be read at a distance without a line-of-sight requirement, and without human intervention. Due to this and due to their small size, RFID tags can be placed in boxes with, or even inside consumer items, can be attached to clothes, and can be used in a wide variety of other applications.

RFID tag technologies have been in use for many years but major technology development has happened in the last few years in particular through the Auto-ID Center in collaboration with the Massachusetts Institute of Technology (MIT). An aim was to make RFID tags as simple as possible, with very small chips and a cost per tag of less than 0.1 US$. At this level, it is thought that RFID tags will realistically start to replace the barcodes presently used in relation to many consumer products, and economies of scale will then enable research into new applications. It is likely that the first tags of a sufficiently small size and having a low-enough cost for the above will be passive tags.

Monitoring of Goods Being Moved

When items or goods are moved along supply chains their current location can be determined and recorded on a management system by a number of means. Typically, this is performed using barcodes associated with the items, or groups of items, that are scanned or read at strategic points along a supply chain path. There is an increasing trend to use RFID as this offers significant technical advantages over barcodes.

Monitoring the movement of goods along a supply chain is carried out for various reasons, for example, to prove that correct items have been detected at specific locations and also to gather data relating to the overall flow of goods within supply chains. The data recorded can serve a number of purposes 1) provide proof of dispatch or arrival, 2) enable queries to be resolved regarding, for example, the predicted arrival time of goods based on a statistical history 3) used to examine a supply chain so that any inefficiencies can be determined and removed 4) detect anomalies in the supply chain such as diversion of goods.

To obtain an accurate indication of the movement of goods within supply chains it is necessary to have significant number of RFID read-points (an RFID read-point is generally an RFID reader and an aerial array at a known physical location and with a network connection for transferring data). In many applications, there are only a minimum number of read-points that are available and no information about the movement of goods between the read-points is possible.

Being able to know the movement profile of goods in transit between read-points can aid in detecting departures from the norm and help in improving efficiency of the supply chain by identifying periods of time when items are static and not being moved.

Generally, passive RFID tags or barcodes alone are not able to register the fact that an item has been disturbed or displaced.

An RFID tag can be purely passive (without its own power source) and is primarily capable of relaying a unique identity. Other variants of passive RFID tags (such as semi-passive RFID tags) are capable of storing data. Alternatively, RFID tags can have an associated power source such as an on-board battery either to extend the reading-distance range or to add extra sensing and/or processing functionality. As well as increased cost and size, however, a disadvantage of active RFID tags is the finite battery-life of the associated power supply.

Radio-location

Location using multiple RF sources each having a known location. This can be achieved by using Wi-Fi access points, cellular radio base stations and rely on powered receivers to calculate relative position using triangulation, time of arrival, etc. Variants of these systems can work indoors and outdoors with limited accuracy.

GPS functions in a similar manner where the orbit of satellites is predetermined. Generally GPS is a system that will only reliably work outdoors with powered receivers.

Energy Scavenging

There are many techniques for scavenging energy: optical, acoustic and temperature differential, etc. Of particular interest are those systems that harvest RF energy (e.g. from RFID readers) and those that convert motion or mechanical vibration to electrical energy.

A UK-based company called "Perpetuum" produces batteryless devices such as a vibration energy harvester known as the "PMG17" micro-generator, further information about which can be found on the internet at http://www.perpetuum.co.uk/home.php?page id=11. Such devices are capable of converting vibration into electrical energy.

Perpetual mechanisms can be constructed using an oscillating fan-shaped rotor weight that swings on a pivot. The weight that rotates in both directions can be used in wristwatches to wind the mainspring as the watch is being worn. An extension of this mechanism would be to convert the stored mechanical energy into electrical energy.

Tracking Devices

The Letter Logger: http://www.trackingtheworld.com/letterlogger.htm is a battery-powered letter tracking device which receives GPS signals and stores the location data. Operation can be triggered in a tilt mode which reports only when a tilting movement is detected.

PRIOR ART PATENT DOCUMENTS

United States patent application US 2007/024410 describes methods and systems for monitoring environmental conditions using an RFID tag which includes one or more sensor arrays. Bimorphic beams are used as sensors and temperature, humidity, acceleration and tilt can for example be sensed.

United States patent application US 2007/018819 describes a reconciliation mechanism using RFID and sensors. Data from the sensors are stored in a memory on the RFID tag. The sensors can for example sense if something is removed from a box or they can sense temperature, humidity or location.

United States patent application US 2007/096906 describes a system for monitoring a package. A transponder is mounted on the package and if the package has been tampered with this is revealed when the tag is read. The tag can include a pressure, impact or tilt sensor, and an event sensed by the sensor is written to the memory in the RFID tag.

United States patent application US 2005/052284 describes a system for automatic conditioning of data accumulated by sensors monitoring supply chain processes.

International patent application WO 2006/102437 relates to an energy harvesting device having a piezoelectric material which can be used to generate an electrical charge. The device may have one or more sensors or other powerable devices associated with it for sensing external parameters or observing external conditions, including pressure sensors, temperature sensors, humidity sensors, accelerometers, light level sensors, gas sensors, pathogen sensors, cameras, microphones and motion sensors. It is stated that such devices may be used in combination with RFID tags.

International patent application WO 2005/056311 relates to a sensor transponder and to a method for calculating a tyre contact length. The sensor transponder, together with at least one acceleration sensor, is mounted on the inside of the tread of a tyre. Signals of the acceleration sensor are said to be integrated with predetermined threshold values and subsequently integrated, whereby the determination of the tyre contact length ensues after a quotient formation in a manner that is independent of the speed.

German patent application DE 10 2006 042735 relates to a communications device for transmitting data on a product to a data processing device, the product being assigned a transponder, which can be brought into communication as required with a read device assigned to the data processing device. The transponder may be equipped with a transducer for converting a physical quantity of the product into an electrical quantity.

United States patent application US 2008/018466 relates to a self-charging RFID tag, having a rechargeable solid-state battery, control circuitry coupled to the rechargeable solid-state battery, and a power source for recharging the rechargeable solid-state battery.

With passive RFID tags, power is generally only available for data processing on the tag while the tag is involved in an interaction with an RFID reader and for a short period thereafter. Including a power source on an RFID tag (i.e. to make it a semi-active or an active tag) generally adds to the size and cost of the tag, and due to the fact that energy will dissipate from the power source over time, there may be insufficient power left for processing on the tag if a sufficiently long period of time has passed since the power source was manufactured, or since the previous re-charging operation.

SUMMARY OF THE INVENTION

According to the present invention, there is provided a monitoring device for monitoring movement characteristics of an item with which the monitoring device is associated, the monitoring device comprising:
  a transducer operable to generate an electrical signal in response to movement of the item;
  a radio-frequency identification device having a data recorder operable to record data on receipt of an electrical signal from said transducer, and a radio-frequency signal transmitter operable to transmit a radio-frequency signal indicative of data recorded by said data recorder;
  an electrical store operable to store energy on receipt of an electrical signal from said transducer, said electrical store being operable to serve as a supply of energy for the radio-frequency identification device; and
  an electrical signal splitter operable to split an electrical signal generated by the transducer into a first portion and a second portion, and to provide said first portion to said electrical store and said second portion to said radio-frequency identification device whereby to allow said data recorder to record data in dependence on said second portion.

According to preferred embodiments, the transducer is operable to generate an electrical signal in response to changes in movement of the item such as vibration, acceleration, deceleration or change of direction. Alternatively, in certain situations, the transducer may be operable to generate an electrical signal in response even to consistent movement relative to a particular frame of reference, using a miniature wheel or wind-turbine element attached to a dynamo, for example, or using the interaction with an electromagnetic field through which the item passes, for example.

According to some embodiments, the device may further comprise an on-board clock associated with the data recorder, whereby to enable time data to be recorded in conjunction with said data recorded on receipt of an electrical signal. Alternatively, or possibly additionally, the device may comprise a time signal receiver associated with the data recorder, whereby to enable time data to be recorded in conjunction with said data recorded on receipt of an electrical signal. By virtue of such an on-board clock or time signal receiver, it essentially allows data relating to activity to be "time-stamped". This can be used to record the onset and end of a period of activity or the amount of vibration detected at a particular time, for example.

The device may further comprise one or more sensors for sensing external parameters or observing external conditions such as temperature, pressure, humidity, light level, presence of specific chemical substances, etc. Data relating to such parameters may be stored together with or in association with said data recorded on receipt of an electrical signal, or separately. In embodiments where the device further comprises an on-board clock or a time signal receiver, the data relating to external parameters or external conditions may be stored together with or in association with time data obtained therefrom.

According to preferred embodiments, the radio-frequency identification device comprises a passive RFID tag. This may comprise a standard passive RFID tag, or a device having components in common with those of a standard passive RFID tag, modified where appropriate in order to provide the required additional functionality. Alternatively, the radio-frequency identification device may comprise an active or semi-active RFID tag, or, likewise, a device having components in common with those of a standard active or semi-active RFID tag, modified where appropriate in order to provide the required additional functionality.

According to preferred embodiments of the invention, a monitoring device based on passive RFID components is able to detect movement and record the detected movement without requiring a battery. Such a device is able to use the movement to obtain sufficient power for a microcontroller part of the RFID device to operate, and this is in turn able to record data relating to the movement from which the power has been obtained. By virtue of this, even if the device is in transit between nodes from which it can harness power (RFID readers, for example) for sufficiently long periods of time that any energy stored during previous interactions with such nodes may have dissipated, the device is still able to obtain sufficient energy at precisely the times when it is required to record data indicative of activity.

In preferred embodiments, a micro-generator that generates power from vibration or movement can be used to generate a signal when activated by vibration or movement. Power so generated can also be harvested and stored for later use by the device.

In preferred embodiments, energy may also be derived from the electromagnetic field of an RFID-reader when the device is in sufficiently close proximity thereto, and this energy may be stored, either in the same electrical store as that used to store energy on receipt of an electrical, or in a separate energy store which may be used primarily when the device is required to transmit a signal to the same or another RFID reader.

In some embodiments, the device may record data continuously or frequently during periods of activity. In other embodiments, the device may simply record the onset and end of a period of activity, for example. This can decrease the power needed to take and store data.

Data indicative of movement may be recorded as a series of intervals representing movement of vibration, above or below a threshold, of an item. Such data can be used to create an activity profile between nodes.

Signature or pattern recognition techniques reflecting a process, such as the activity profile for the movement of goods between two known points, may be used as a reference against which other activity profiles can be compared. Other strategies exist for recording activity, interpreting and using the data, such as the proportion of time the item is in motion or static, the utilisation rate, etc.

Monitoring devices according to preferred embodiments can be used to assist in scenarios such as the following:
- to provide a decision support tool for business process re-engineering and monitoring;
- to enable supply-chain efficient improvement. A lack of movement might indicate an excessive time that an item has remained on a shelf in a warehouse or insufficient transport or means to move the item, etc.;
- to enhance supply-chain track and trace solutions, for example by acquiring information relating to the movement of objects between RFID read points;
- to log data relating to the running time of equipment, i.e. equipment that moves or vibrates, for example;
- to improve asset management, for example by allowing safety-check cycles to be increased or reduced in dependence on the amount of use of an item;
- as a Postal Service performance measurement or diagnostic tool;
- to detect anomalies in supply-chains due to error, inefficiencies or unauthorised activity.

In a supply chain scenario, for example, embodiments of the invention movements of an item to be logged to create an 'activity' profile between nodes. This may achieved by detecting discrete changes in the state rather than by continuous sampling (as would generally be done with vibration monitoring).

BRIEF DESCRIPTION OF THE DRAWINGS

A preferred embodiment of the present invention will now be described with reference to the appended drawings, in which.

DESCRIPTION OF PREFERRED
EMBODIMENTS OF THE INVENTION

Figure 1:
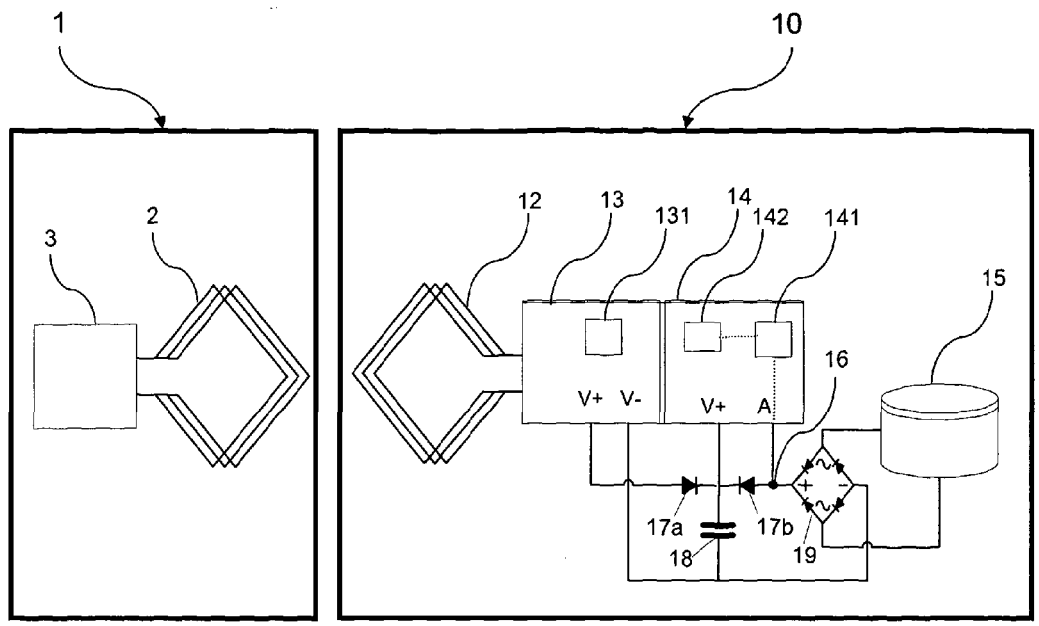
FIG. 1 shows a system including a monitoring device according to a preferred embodiment, and an associated RFID reader device.

With reference to FIG. 1, a monitoring device according to a preferred embodiment will be described.

FIG. 1 represents an arrangement including an RFID reader 1 and a monitoring device 10, the monitoring device itself comprising key components 12, 13 and 14 of an RFID tag as will be explained later. It will be understood that the relative sizes of boxes 1 and 10 as shown are not intended to be indicative of the actual or relative sizes of RFID readers and RFID tags (or components thereof)—generally, RFID tags (and components thereof) are significantly smaller than RFID readers—and in this case the sizes and arrangement of the RFID tag components 12, 13 and 14 and other components (to be explained later) of the monitoring device 10 may be chosen such that the overall size of the monitoring device 10 makes it suitable for being attached to, mounted on or otherwise associated with an item whose movement is to be monitored. The monitoring device 10 may have a size and an appearance very similar to or even the same as that of a standard RFID tag.

Referring first to the RFID reader 1, this contains electronic and possibly other components whose functionality will not be described in detail, since these may operate in the same manner as those of a standard RFID reader, but which are indicated generally by box 3. This would in general be connected to a power supply (not shown) or may have an on board power supply such as a battery (not shown). It may also be connected, possibly via a network such as the Internet or an intranet for example, to an external database comprising look-up tables relating to items with which RFID tags may be associated, for example, and/or to other computing or information resources. The functionality of the components of box 3 may include generating a trigger signal suitable for triggering a response from an RFID tag and/or interpreting and/or processing a response signal received from an RFID tag and/or communicating with external computing or information resources. RFID reader 1 also has an aerial 2 for transmitting the trigger signal as a radio-frequency (RF) signal to an RFID tag and for receiving the response signal in the form of an RF signal from an RFID tag, and providing this to the relevant processing components of box 3.

The monitoring device 10 has an aerial 12 which is connected to an RFID front-end 13 which has an associated microprocessor 14. The RFID front-end 13 has a means of scavenging energy received via aerial 12 from an electromagnetic field such as that generated by RFID reader 1—this may be temporarily stored in an energy store 131 and used when transmitting response signals to RFID reader 1, and to power the microprocessor 14 at least when the monitoring device is near enough to RFID reader 1 to be exposed sufficiently to its electromagnetic field, and also for a short period thereafter. The monitoring device 10 also has a vibration or movement sensor 15 (for example, a Perpetuum PMG17 vibration energy harvester (see earlier reference)), which produces an electrical signal in response to vibration or movement. This electrical signal is split into two portions at a junction 16 in order to allow the same electrical signal to be used for two separate but related purposes: as data to be stored in a memory component of the microprocessor 14; and as a supply of energy for use by the microprocessor 14. As will be understood, such an arrangement may be used to ensure that even at times long after any energy scavenged from an electromagnetic field of an RFID reader 1 has dissipated, if the monitoring device 10 is subjected to vibration or movement, the microprocessor 14 may still be provided with energy with which to perform functions such as storing and processing data provided to it. This is of particular importance when it is data relating to vibration or movement of the monitoring device 10 itself that is required to be stored and/or processed.

The junction 16 may simply be a branching point in an electrical wire which splits electrical signals into two portions, one continuing via each branch, or it may be a more complex component such as a filter, capable of filtering particular fractions or amounts of the electrical signal for one or other of the branches. A first portion of the electrical signal allows energy to be scavenged from vibration or movement. Thus, in addition to any energy remaining that was scavenged via aerial 12 from the electromagnetic field of the RFID reader 1 when the monitoring device 10 was last near enough to an RFID reader 1, the first portion of the electrical signal from the vibration or movement sensor 15 allows energy to be scavenged from vibration or movement of the monitoring device. This is stored in an energy storage component 18 such as a capacitor with a low leakage or internal discharge. Other components 17a and 17b provide a low resistance path to current in one direction and a high resistance path to current in the reverse direction to avoid unwanted discharge paths. A device 19 such as a bridge rectifier converts AC signals to DC. The microprocessor 14 has an input A to which the second portion of the electrical signal from the vibration or movement sensor is applied, thereby allowing it to measure the voltage generated by the vibration or movement sensor. This enables the monitoring device to detect whether it (and hence an associated item to which it is attached or on which it is mounted) is static or in motion. Data indicative of the current activity that has caused the signal to be generated is then stored in a data store 141. The data could simply be binary data, indicating whether or not any activity has been observed, or data could be stored indicative of the size of the generated signal. Such data could also be used as a measure of vibration signature or motion characteristic, which might also be relevant in some scenarios.

According to some embodiments, the microprocessor 14 may have a timing device 142 such as a low-power clock associated with the data store 141, in which case timestamps can be stored relating to the time of any event which results in an electrical signal being produced by the sensor 15, or indicative of the start and finish of any associated activity, for example.

An alternative way of ensuring that timestamps for events or periods of activity can be recorded without the need for an on-board clock involves incorporating as the timing device 142 a device such as a radio clock receiver capable of receiving a transmitted time code, such as the MSF signal. The MSF signal (also known as the Rugby Clock Signal) is a signal broadcast at a highly-accurate frequency of 60 kHz, which can be received throughout the UK, and also in much of northern and western Europe. Similar signals may be found in other parts of the world. The MSF signal can be received using very low-power receivers. By means of a radio clock receiver associated with the microprocessor 14, it would not be necessary for an on-board clock to be present, let alone to be kept powered and running during a long period of inactivity—activation of microprocessor 14 may only be necessary once a period of activity occurs, at which point energy scavenged by sensor 15 from the movement or vibration of the monitoring device would be available to allow the microprocessor 14 to record data such as the start and finish time of the period of activity. Other sources of clock data that could be received include Global Positioning System (GPS), Radio Data System (RDS), Digital Radio Mondiale (DRM), mobile telephone technologies and sub-audible time-code information broadcast from radio stations.

If the microprocessor 14 does not have any timing device such as an on-board clock or a radio clock receiver associated with the data store 141, other useful metrics can still be obtained. It may simply be desired to register that an item with which the monitoring device is associated has been moved (via a binary trigger), or how many times the item has been moved during a period of interest or journey of interest, for example. Alternatively, a measure may be obtained of the percentage of time that the item has been in motion or static (via cumulative intervals), by logging fixed-length intervals during which the item is being moved, for example.

It will be noted that in FIG. 1, the symbols for conventional diodes and capacitors are used. This is not intended to be limiting, and has been done principally in the interests of clarity.

Other devices such as integrated circuits or arrangements using other microelectronic components that provide similar functionality to that described may of course be used.

The arrangement shown in FIG. 1 has been described principally in relation to passive RFID technology, but it should be noted that other arrangements are possible which make use of features or aspects of other identification and communication techniques.

Communication between tags and readers may be performed by means of a direct electrical connection, or using other communications protocols such as those according to I2C (Inter-Integrated Circuit) or RS232 standards, for example.

Figure 2:
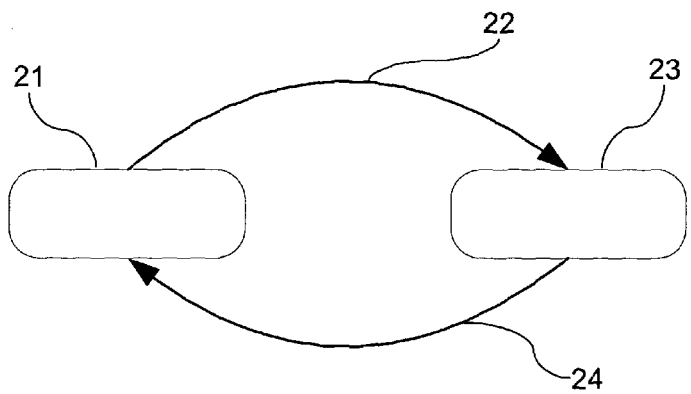
FIG. 2 represents a power-activity loop.

FIG. 2 represents a power-activity loop, which illustrates how energy scavenged from such as vibration or other movement may be used to power the means by which data indicative of that activity itself may then be processed and/or stored. Energy 21 is derived 24 from the activity events 23. Energy 21 is used to monitor 22 the activity events 23.

Figure 3:
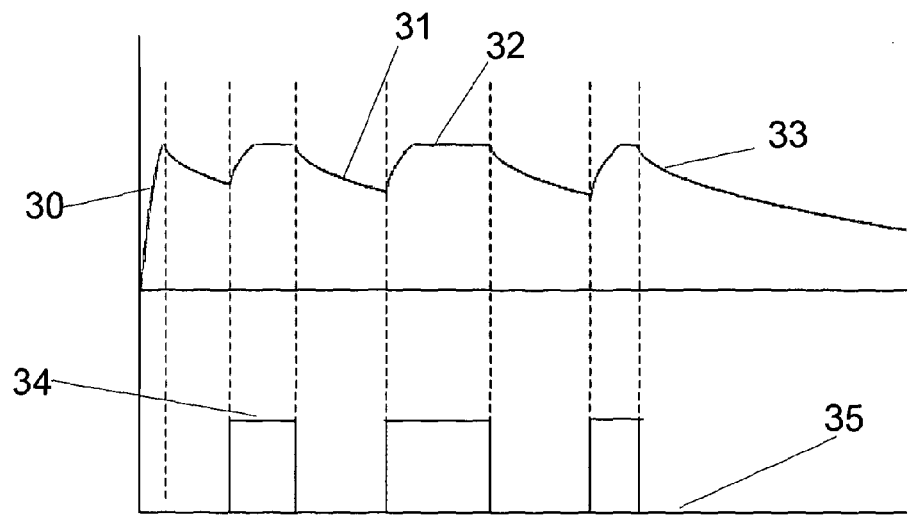
FIG. 3 is a graphical representation of power generation and movement detection.

FIG. 3 illustrates the resultant voltage measured across the storage device 18 from an initial charge 30 from an RFID reader or alternative means (see http://www.mit.edu/~soljacic/wireless power.html for example). In time, it can be expected that this voltage will decay slowly. Periods of activity 34 will result in the vibration/motion sensor 15 generating an output which will be detected by the microcontroller (input A). The amount of charge stored 32 will be dependent on the item being in motion or the device receiving energy from an RFID reader or other external source. When movement ceases 35 there is no charging output from the scavenging device and the amount of charge stored decreases 31, 33. The sensor could be configured to provide an output that is proportional to the amount of vibration or movement (ADC on microcontroller storing a voltage proportional to the associated movement).

Figure 4:
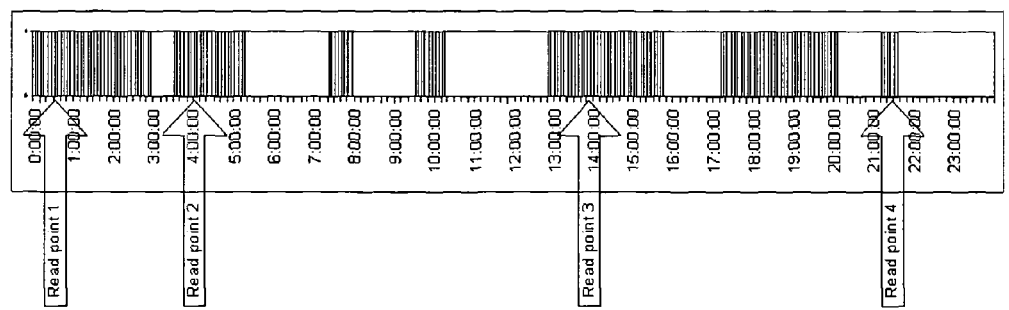
FIG. 4 represents a possible movement profile or signature of an item over a period of twenty-four hours.

FIG. 4 shows a possible output of a device operating according to an embodiment, representing the movement profile or signature of an item over 24 hours. The marks (i.e. the vertical lines shown) made on a print-out representing the period of 24 hours over which the item has been monitored indicate periods of activity such as those indicated by reference 34 in FIG. 3. Four arrows indicate four "reading points" at which an item having a monitoring device such as monitoring device 10 in FIG. 1 is in sufficiently close proximity to an RFID reader such as RFID reader 1 in FIG. 1 for a read operation to be performed.

A profile such as that shown in FIG. 4 could be compared with a typical pattern, or patterns obtained from previous periods of monitoring. An observed pattern of movement may be thought of as representing a 'fingerprint' of supply chain activity, for example—significant departures from this pattern might warrant investigation.

The invention claimed is:

1. A monitoring device for monitoring movement characteristics of an item with which the monitoring device is associated, the monitoring device comprising:
   a transducer operable to generate an electrical signal in response to movement of the item;
   a radio-frequency identification device having a data recorder operable to record data on receipt of an electrical signal from said transducer, and a radio-frequency signal transmitter operable to transmit a radio-frequency signal indicative of data recorded by said data recorder;
   an electrical store operable to store energy on receipt of an electrical signal from said transducer, said electrical store being operable to serve as a supply of energy for the radio-frequency identification device; and
   an electrical signal splitter operable to split an electrical signal generated by the transducer into a first portion and a second portion, and to provide said first portion to said electrical store and said second portion to said radio-frequency identification device whereby to allow said data recorder to record data in dependence on said second portion.

2. A monitoring device according to claim 1 wherein the transducer is operable to generate an electrical signal in response to changes in movement of the item such as vibration, acceleration, deceleration or change of direction.

3. A monitoring device according to claim 1 wherein the device further comprises an on-board clock associated with the data recorder, whereby to enable time data to be recorded in conjunction with said data recorded on receipt of an electrical signal.

4. A monitoring device according to claim 1 wherein the device further comprises a time signal receiver associated with the data recorder, whereby to enable time data to be recorded in conjunction with said data recorded on receipt of an electrical signal.

5. A monitoring device according to claim 1 wherein the device further comprises one or more sensors for sensing external parameters or observing external conditions such as temperature, pressure, humidity, light level, presence of specific chemical substances, etc.

6. A monitoring device according to claim 1 wherein the radio-frequency identification device comprises a passive RFID tag.

7. A monitoring device according to claim 1 wherein the radio-frequency identification device comprises an active or semi-active RFID tag.

8. A Radio Frequency Identification (RFID) tag comprising:
   a vibration or movement sensor configured to produce an electrical signal in response to vibration or movement;
   a junction configured to split the electrical signal into a first electrical signal portion and a second electrical signal portion;
   a microprocessor including a memory, the microprocessor configured to (i) receive the second electrical signal portion of the electrical signal and (ii) store data, based on the received second electrical signal portion of the electrical signal, in the memory of the microprocessor indicative of the vibration or movement; and
   an energy storage device configured to (i) store energy on receipt of the first electrical signal portion of the electrical signal and (ii) supply the stored energy to the microprocessor to enable the microprocessor to process or store the data indicative of the vibration or movement based on the second electrical signal portion of the electrical signal.

9. The RFID tag of claim 8 wherein the junction comprises a filter configured to filter particular fractions of the electrical signal into the first electrical signal portion and the second electrical signal portion.

10. The RFID tag of claim 8 wherein the RFID tag is a passive RFID tag and the energy storage device is configured to supply the stored energy to the microprocessor to enable the microprocessor to process or store the data indicative of the vibration or movement based on the second electrical signal portion of the electrical signal after energy generated in the RFID tag as a result of interaction of the RFID tag with a RFID reader has dissipated.

11. The RFID tag of claim 8, wherein the energy storage device comprises a capacitor.

* * * * *